United States Patent [19]

Pitman

[11] 4,211,332

[45] Jul. 8, 1980

[54] COLOR CODED BOOM AND CHART SYSTEM

[75] Inventor: Raymond F. Pitman, Johnson County, Kans.

[73] Assignee: R O Corporation, Olathe, Kans.

[21] Appl. No.: 892,948

[22] Filed: Apr. 3, 1978

[51] Int. Cl.[2] ........................ G01D 21/00; B66C 13/14

[52] U.S. Cl. .................................... 212/157; 116/284; 116/305; 414/698

[58] Field of Search ............... 116/284, 309, 330, 335, 116/247; 33/1 N; 212/39 R, 39 A, 39 MS; 214/761

[56] References Cited

U.S. PATENT DOCUMENTS

| | | | |
|---|---|---|---|
| 1,773,589 | 8/1930 | Lichtenberg | 212/39 A X |
| 2,117,442 | 5/1938 | McWeeny | 116/247 |
| 2,589,896 | 3/1952 | Toland | 116/285 |
| 2,808,017 | 10/1957 | Killibrew | 116/28 A X |
| 3,011,261 | 12/1961 | Riley | 116/299 X |
| 3,389,678 | 6/1968 | Fenwick | 116/335 X |
| 3,824,947 | 7/1974 | Honkaranta et al. | 116/335 |

FOREIGN PATENT DOCUMENTS

| | | | |
|---|---|---|---|
| 2032968 | 1/1972 | Fed. Rep. of Germany | 212/39 A |
| 1347580 | 2/1974 | United Kingdom | 212/39 A |

*Primary Examiner*—Daniel M. Yasich
*Attorney, Agent, or Firm*—Lowe, Kokjer, Kircher, Wharton & Bowman

[57] ABSTRACT

A color coding system for correlating the stages of a multiple stage, telescoping boom with the corresponding sections of a load chart and boom extension chart. The charts are arranged in separate sections which indicate, for various positions of the boom, the angle of the boom with respect to horizontal, its effective horizontal moment arm, and the maximum load that it can safely handle. The boom stages are each provided with a different exterior color, and the chart sections are colored such that each section is correlated with the boom stage to which it corresponds. Since the colors of the boom stages that are extended are readily visible, the color coding system facilitates reference to the proper sections of the charts and decreases the possibility of human error in reading of the charts.

6 Claims, 3 Drawing Figures

COLOR CODED BOOM AND CHART SYSTEM

BACKGROUND AND SUMMARY OF THE INVENTION

This invention relates generally to multiple extension apparatus such as the telescoping booms of truck mounted cranes and similar machines. More specifically, the invention is directed to a color coding scheme which correlates the various boom stages with the corresponding sections of load charts and boom extension charts that are commonly used in connection with equipment of this type.

Truck mounted cranes are used in a variety of situations to handle various types of loads. Typically, equipment of this nature includes a multiple stage boom assembly which is mounted rotatably on a turntable with the main frame attached to the truck frame and which is also pivotal up and down about a horizontal axis. The boom stages are usually telescopically extensible and retractable by means of a hydraulic system having suitable controls. In addition, a jib which is often included may be mounted in extension from the outer boom stage in order to increase the overall length of the boom.

Loads that can be safely handled by the boom with only the intermediate boom stage extended can be excessive for the same boom angle but with the outer boom stage also extended. Similarly, a load that can be easily handled with the boom raised to a considerable angle above horizontal can be excessive if the boom is lowered such that its effective horizontal length is increased, thereby increasing the moment applied about the base end of the boom. In addition, for a given effective horizontal length of the boom, loads can be handled more safely with only the intermediate boom stage extended than with the outer stage also extended, since the strength of the smaller outer stage is less than that of the larger intermediate stage. Consequently, at each pivotal position of the boom, there is a maximum load that can be safely handled with the boom at a particular stage of extension. If attempts are made to handle loads greater than the maximum safe load, the resulting instability can cause overturning of the truck, extensive damage to the boom or other portions of the machine, and more importantly, serious injury to workmen and others.

In order to decrease the likelihood that attempts will be made to use the boom for lifting excessive loads, manufacturers commonly provide load charts which indicate the maximum load that can be safely handled at various boom positions. Also, a boom extension chart and associated pointed are usually provided on the boom glove to indicate the boom angle and the effective horizontal moment arm of the boom at various positions. If the load chart indicates that the load is excessive for a particular position of the boom, the boom must either be retracted or pivoted upwardly so as to decrease its effective horizontal moment arm before the load can be safely handled.

Even though charts of this type have been helpful, they are rather difficult to read correctly and may not completely solve the problems of personal injury and equipment damage that can occur when excessive loads are lifted. For example, even though the boom extension chart may be read properly to indicate the correct angle of the boom above horizontal, if reference is inadvertently made to the wrong section of the load chart for that angle, there may be an indication that the load can be safely handled when in fact it cannot. Therefore, despite the widespread use of load charts, unsafe conditions can still arise with considerable frequency, primarily due to human error and usually because reference could be made to an incorrect section of the load chart. It is this particular problem that the present invention is aimed at solving.

More specifically, it is an object of the invention to provide a color coding system that correlates the various stages of a telescoping boom with the corresponding sections of accompanying load and boom extension charts. The color coding scheme provided by this invention results in virtual elimination of the human error that can be involved in reading the charts and assures that reference is made to the proper sections of the chart for all positions of the boom. Consequently, the personal injury and equipment damage that has plagued this type of machinery is minimized.

Another object of the invention is to provide a color coding system which is simple and economical and which can be applied to both new and used equipment.

Yet another object of the invention is to provide a color coding system that is readily adapted for use with various types of multi-stage boom assemblies and various types of charts.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 1:
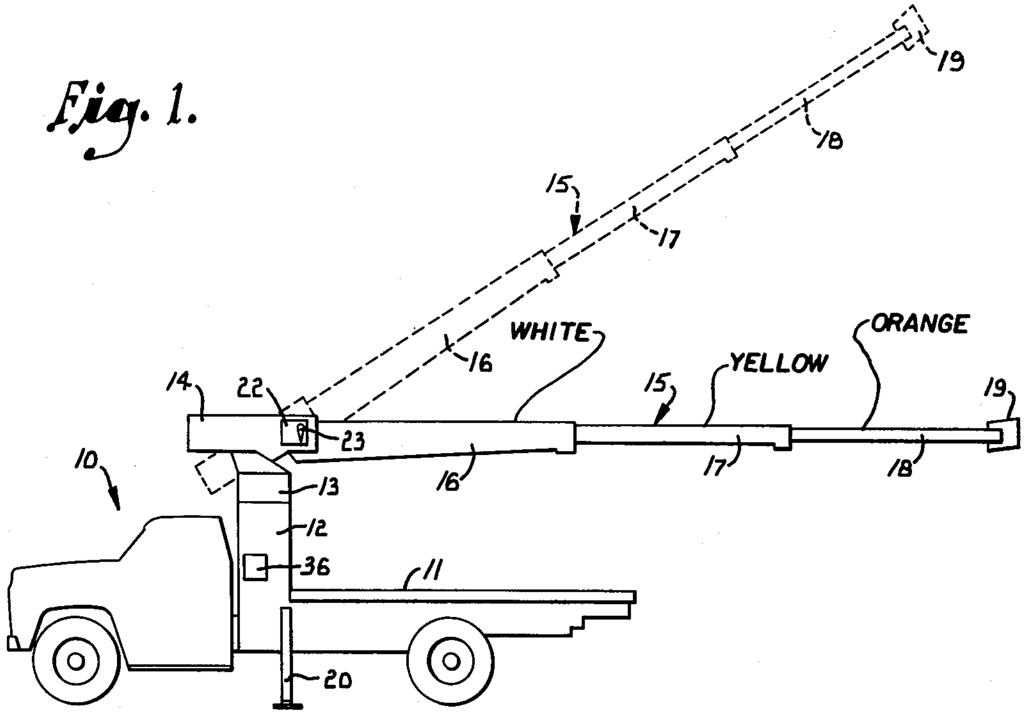
FIG. 1 is a side elevational view of a typical truck mounted crane having a three stage telescoping boom that is color coded in accordance with the present invention, with all three stages of the boom extended and the broken lines indicating a raised pivotal position of the boom.

Referring initially to FIG. 1, numeral 10 designates a conventional truck having a bed 11 and an upright main frame 12, which is mounted to the truck frame. A turntable 13 is mounted on top of main frame 12 for rotation about a vertical axis. Mounted on turntable 13 in a manner to pivot up and down about a horizontal axis is a boom glove 14 from which a multiple stage boom 15 extends.

Boom 15 includes three sections or stages, including a base stage 16 which is mounted to the base end of the boom. A second or intermediate boom stage 17 is connected with the base stage 16 in a manner to telescopically extend and retract with respect thereto. Similarly, a third or outer boom stage 18 is mounted to telescopically extend and retract relative to the intermediate stage 17. The outer tip of the third stage 18 carries sheaves 19. A winch (not shown) is mounted in boom glove 14 and equipped with a cable (also not shown) that is drawn around sheaves 19 and provided with a hook or other lifting tackle on its end. Outriggers 20 stabilize the truck when boom 15 is used to handle loads of various types. A jib (not shown) is often provided and is constructed to be mounted in extension from the outer end of boom stage 18 to thereby increase the overall length of boom 15.

Boom stages 17 and 18 are extended and retracted in a well known manner by a conventional hydraulic cylinder (not shown) mounted within the boom and operated by suitable controls. The hydraulic system that operates the cylinder is arranged such that stage 17 is fully extended before extension of stage 18 begins, and stage 18 is fully retracted before stage 17 begins to retract. Rotation of turntable 13 and the connected boom is effected by a hydraulic motor and associated gear system (not shown) while boom 15 is pivoted up and down by another hydraulic cylinder (also not shown). The mechanical and hydraulic components of the machine are constructed conventionally and operate in a manner well known to those skilled in the art.

Figure 2:
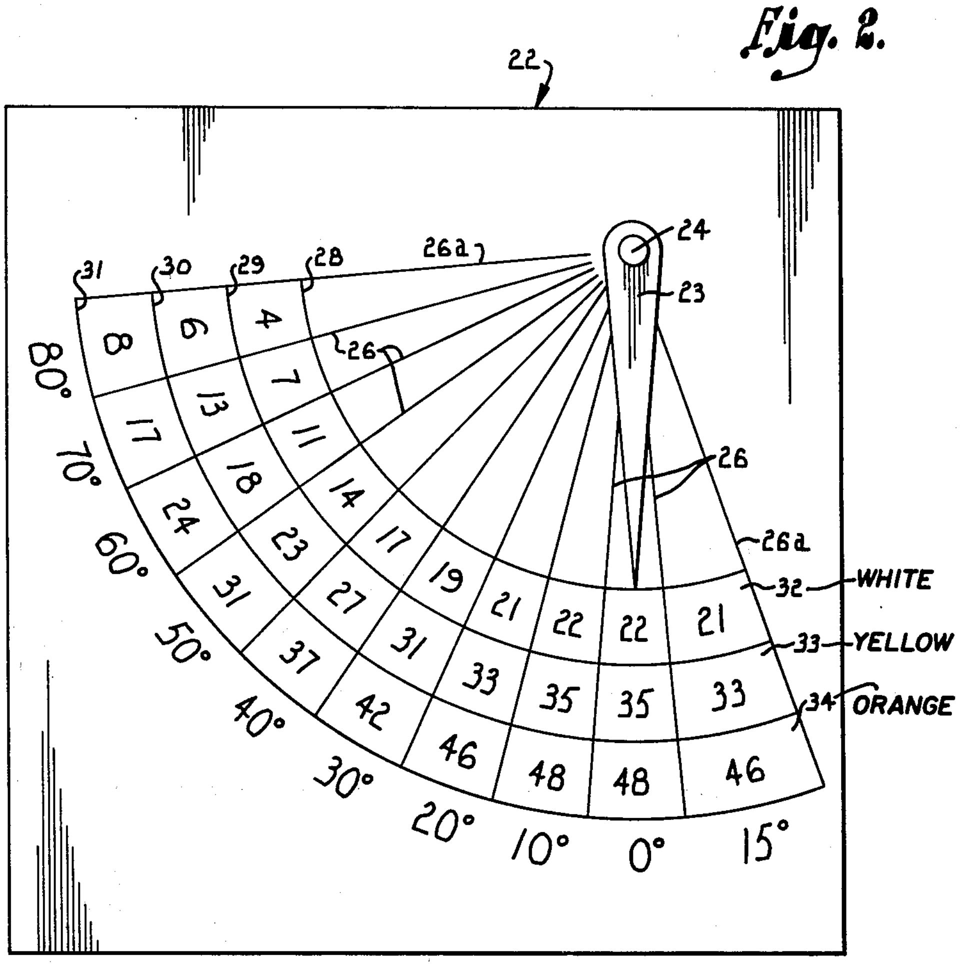
FIG. 2 is an elevational view showing a boom extension and angle chart that is color coded in accordance with the invention.

Secured to the boom glove 14 is a boom extension and angle chart 22 which is illustrated in detail in FIG. 2. Chart 22 is riveted or otherwise fixed to the side of glove 14 and has a pendulum pointer 23 which is loosely pivoted on a bolt 24. Accordingly, the pointer always remains vertical points straight downwardly under the influence of gravity regardless of the angular position of the boom with respect to horizontal.

Chart 22 is arranged and labeled to indicate the instantaneous angular position of boom 15 relative to horizontal. The chart is marked with a plurality of radius lines 26 having bolt 24 as their common center. The outermost radius lines are identified at 26*a*. The radius lines 26 and 26*a* cooperate to present therebetween a plurality of sectors centered about bolt 24 and labeled to indicate the angular position of boom 15 in cooperation with pointer 23. The sector in which pointer 23 is located when the boom is horizontal is labeled "0°", and the other sectors are successively labeled "10°", "20°", etc. to indicate, when referenced by pointer 23, the angle of the boom above horizontal. The sector labeled "15°", when referenced by pointer 23, indicates that the boom is 15° below horizontal.

Chart 22 also provides an indication of the effective horizontal moment arm of boom 15 at various angles and with the boom at various stages of extension. To this end, the chart is provided with arc lines 28, 29, 30 and 31 which are each struck about bolt 24 and which present three separate arcuately shaped sections of the chart therebetween. Section 32 of the chart, located between the innermost arc line 28 and the second arc line 29 and between the outermost radius lines 26*a*, corresponds to the base boom stage 16. Similarly, the section 33 between arc lines 29 and 30 and the outer radius lines 26*a* corresponds to the intermediate boom stage 17, while the section 34 located between arc lines 30 and 31 and the outer radius lines 26*a* corresponds to the outer boom stage 18.

Each of the relatively small areas located between adjacent radius lines 26 and adjacent arc lines is marked with a numeral which has been determined by previous testing and which indicates the effective horizontal moment arm of the boom. As an example, with the boom oriented at 40° above horizontal and with only the intermediate boom stage 17 extended, the numeral "27" would be indicated since section 33 of the chart is used when only stage 17 is extended. This indicates that the effective horizontal moment arm of the boom is 27 feet. At the same 40° angle but with the third boom stage 18 also extended, the chart indicates the effective horizontal moment arm of the boom to be 37 feet as indicated by chart section 34. At the same boom angle but with neither stage 17 nor 18 extended, the effective moment arm is 17 feet, arrived at by referring to section 32 of the chart.

Figure 3:
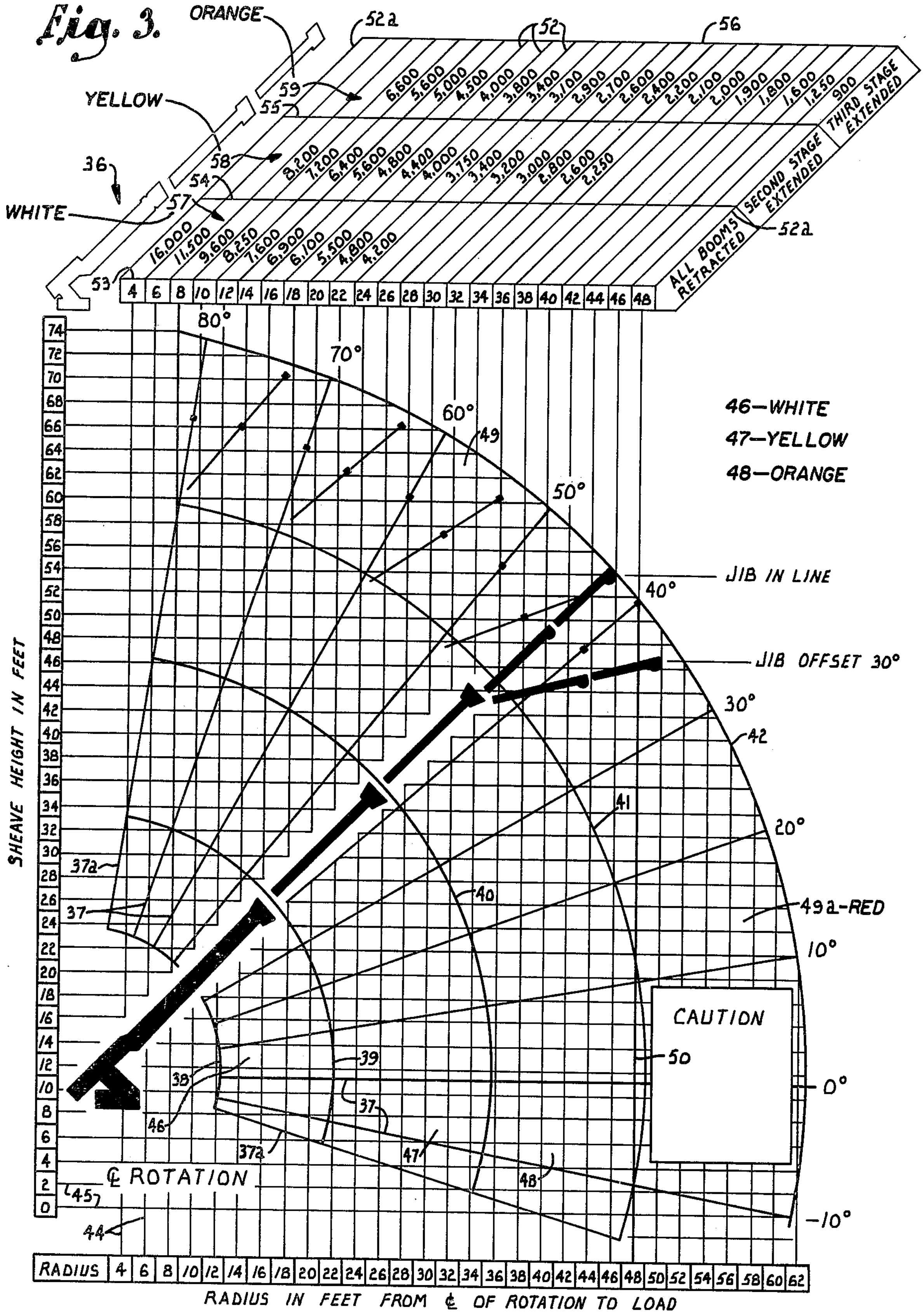
FIG. 3 is an elevational view of a load chart that is color coded in accordance with the invention.

With reference again to FIG. 1, a load chart 36 is mounted on one side of pedestal 12 near the location of the hydraulic controls (not shown) which control operation of boom 15. FIG. 3 best illustrates the details of chart 36, which serves to indicate the maximum loads that can safely be handled at various positions of the boom. Chart 36 includes a plurality of spaced apart radius lines 37 drawn from a common point corresponding to the pivotal pin of boom 15. The outermost radius lines are indicated at 37*a*. Spaced arc lines 38, 39, 40, 41 and 42 are struck about the same central point and intersect the radius lines 37. Each radius line 37 is labeled beyond its end to indicate that it corresponds with a particular angle of boom 15 above the horizontal (or below horizontal in the case of the "−10°" radius line).

Chart 36 also has a plurality of uniformly spaced vertical lines 44 which are located and labeled to indicate the effective horizontal length of boom 15 at various positions thereof. Horizontal lines 45 are likewise uniformly spaced apart from one another and are located and labeled such that the height of sheaves 19 above the ground is indicated at various boom positions.

The curved section 46 of chart 36 is presented between arc lines 38 and 39 and between the outermost radius lines 37*a* corresponds to the base boom stage 16. The section 47 located between arc lines 39 and 40 and the outer radius lines 37*a* corresponds to the intermediate boom stage 17, while the section 48 located between arc lines 40 and 41 and the outer radius lines 37*a* corresponds to the outer boom stage 18. Numeral 49 identifies the curved section of the chart corresponding to a jib that may be mounted in extension from the outer boom stage 18. Section 49 is located between the outermost radius lines 37*a*. Section 49 has a subsection 49*a* bounded by arc line 42, the lowest horizontal line 45, and a heavy vertical line 50 lying along the "48" foot vertical line 44.

Chart 36 further includes an upper portion that is marked with a series of parallel inclined lines 52 and four spaced apart horizontal lines 53, 54, 55 and 56 that intersect with the inclined lines 52. A section 57 of the chart located between lines 53 and 54 and the outermost inclined lines 52*a* corresponds to the base boom stage 16. The notation "ALL BOOMS RETRACTED" is marked at the right end of section 57. The next section 58, located between lines 54 and 55 and the outer inclined lines 52*a*, corresponds to the intermediate boom stage 17 and is notated at its right end "SECOND STAGE EXTENDED". An upper section 59 located between lines 55 and 56 and the outer inclined lines 52*a* corresponds to the outer boom stage 18. The notation "THIRD STAGE EXTENDED" is marked at the right end of section 59. Marked between each adjacent pair of inclined lines and each adjacent pair of horizontal lines is a numeral which has been determined by prior testing and which indicates the maximum safe load that can be applied to boom 15 at the corresponding position thereof.

The load chart 36 is used to determine whether or not a particular load can be safely handled with the boom at a particular angle and stage of extension. For example, with the boom at 60° above horizontal and the second stage 17 extended, the intersection of the 60° radius line with arc line 40 is located. From this location, the corresponding vertical line 44 is followed upwardly to the numeral "18" at the upper portion of the chart, indicating that the effective horizontal moment arm of the boom is 18 feet. The space between the two adjacent inclined lines 52 is then traced upwardly to section 58 on the upper portion of the chart, since the second boom stage 17 is extended and section 58 corresponds to this condition. The numeral "4400" which is located at this position indicates that 4400 pounds can safely be handled by the boom, including the weight of load handling equipment such as lifting tackle, buckets and the like. If the total load is in excess of 4400 pounds, boom 15 must either be retracted or moved upwardly to a more pronounced angle, or the truck must be moved closer to the load.

As thus far described, the equipment and the charts are conventional and are used in the manner indicated. The aspects in which the present invention departs from the conventional arrangement will now be described.

In accordance with the invention, the boom stages 16, 17 and 18 are each exteriorly colored with a different color so that a simple glance at the boom will indicate which stages are extended. Thus the base boom stage 16 may be colored white, while the intermediate stage 17 may be colored yellow and the outer stage 18 orange. If the orange color is visible, the intermediate and outer stages are both extended, while only the intermediate stage 17 is extended in the case where yellow is visible but orange is not. If only white is visible, all boom stages are retracted since the outer two stages are essentially hidden when in the retracted condition.

To properly correlate the sections of charts 22 and 36 with the boom stages to which they correspond, the chart sections are provided with colors that correspond to the colors of the appropriate boom stages. Thus, section 32 of the boom extension chart 22 is colored white to correspond to the white color of the base boom stage 16. Sections 33 and 34 of the chart are colored yellow and orange, respectively, to indicate correspondence with boom stages 17 and 18.

Sections 46 and 57 of the load chart 36 are likewise colored white since these sections correspond to boom stage 16. Sections 47 and 58 are colored yellow and sections 48 and 59 are colored orange to correspond with the colors of the respective boom stages 17 and 18. In addition, subsection 49*a* is colored red and provided with a "CAUTION" notation to indicate that the boom should not be used with the jib if the effective horizontal moment arm of the boom is in excess of 48 feet, or in the area of the red subsection 49*a*.

In use, the color coding scheme facilitates accurate reading of charts 22 and 36 in that it virtually assures that reference will be made to the appropriate sections of the charts. Without the color coding system, a error in reading the boom extension chart 22 occurs when reference is inadvertently made to the wrong section of the chart. For example, with boom 15 oriented at 20°, as indicated by pointer 23, and with all boom stages extended, the effective horizontal moment arm of the boom is 46 feet. However, if reference is incorrectly made to section 33 of the chart rather than to section 34, an erroneous indication will be given that the effective horizontal boom moment arm is 33 feet.

Mistakes of this nature are avoided with the color coding system provided by the present invention. When all boom stages are extended, the orange color of the outer stage 18 will be plainly visible, and it will thus alert the chart reader to the fact that reference should properly be made to the orange section 34 of the chart. In this manner, the color correlation between stage 18 of the boom and section 34 of the chart assures that reference will not be made to another incorrect section of the chart.

In much the same manner, the color coding system eliminates errors in the maximum safe loads that are read from the load chart 36. For example, with boom 15 at 60° above horizontal and all boom stages extended, the orange color of the outer stage 18 indicates that reference should initially be made to the orange section 48 on the lower or main portion of chart 36 rather than to the white or yellow sections which do not apply in this situation. Thus, the chart reader can readily locate the intersection of the 60° radius line with the arc line 41 that forms the outer boundary of the orange chart section 48. Following the "24" foot vertical line upwardly from this point to the upper portion of the chart and finally tracing the area between the appropriate inclined lines 52 upwardly to the orange section 59 results in an indication that 3100 pounds can be safely handled at this particular boom position.

Without the color coding system, reference might mistakenly be made to chart section 58 rather than to section 59, since there would be no color indication given as to the proper section of the chart that should be entered. An incorrect safe load reading of 3400 pounds might then be made, and the equipment might be used to lift an excessive load, which could result in serious personal injury or extensive equipment damage.

It is thus apparent that the subject invention virtually eliminates human error in reading of the charts and assures that only safe loads will be handled. It is noted that the charts give conservative readings because of the intermediate boom stage 17 or the outer boom stage 18 is extended to less than its full length, it is treated in reading of the chart as if it were fully extended. Therefore, whether the boom stages are partially or fully extended, their colors will be visible and the chart will be read in the same manner as in the case where the sections are fully extended. Increased safety is thereby provided and the possibility that unsafe loads will be handled is even further decreased.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In combination with a multiple stage boom mounted to pivot about a substantially horizontal axis and including a plurality of relatively extensible and retractable boom stages, the improvement comprising:

means marking the exteriors of said boom stages in a manner visibly distinguishing each stage from the other stages, said marking means for each boom stage being visible when the stage is extended:

a pendulem pointer pivotally secured to a boom glove of the boom;

a boom extension chart presenting thereon a plurality of separate arcuate sections corresponding to the respective boom stages, each said section of the chart providing by the position of said pointer, when the corresponding boom stage is extended relative to said boom glove, an indication of the effective horizontal moment arm length of said boom at various pivotal positions thereof; and means marking each section of said boom extension chart in a manner correlated with the marking means of the corresponding boom stage, thereby facilitating location of the sections of said boom extension chart corresponding to the boom stages that are extended.

2. The improvement set forth in claim 1, wherein:

the marking means for said boom stages comprises means marking each boom stage a different color; and the marking means for each arcuate section of said boom extension chart comprises means marking each arcuate section a color substantially the same as the color of the corresponding boom stage.

3. The improvement set forth in claim 1, including:

a load chart arranged to present thereon a plurality of separate arcuate sections corresponding to the respective boom stages, each said section of the load chart providing, when the corresponding boom stage is extended, an indication of the loads that can be safely applied to the boom at various pivotal positions thereof; and means marking each section of said load chart in a manner correlated with the marking means of the corresponding boom stage, thereby facilitating location of the sections of said load chart corresponding to the boom stages that are extended.

4. The improvement set forth in claim 3, wherein:

the marking means for said boom stages comprises means marking each boom stage a different color;

the marking means for each arcuate section of said boom extension chart comprises means marking each section thereof a color substantially the same as the color of the corresponding boom stage; and the marking means for each section of said load chart comprises means marking each section thereof a color substantially the same as the color of the corresponding boom stage.

5. In combination with a multiple stage boom mounted to pivot about a substantially horizontal axis and including a boom glove and a plurality of relatively extensible and retractable boom stages, the improvement comprising:

means marking the exteriors of said boom stages in a manner visibly distinguishing each stage from the other stages, said marking means for each boom stage being visible when the stage is extended;

a load chart presenting thereon a plurality of separate arcuate sections corresponding to the respective boom stages, each said section of the load chart providing by the angular inclination of the boom relative to the horizontal, when the corresponding boom stage is extended relative to said boom glove, an indication of the loads that can be safely applied to said boom at various angulation inclinations thereof relative to the horizontal; and means marking each arcuate section of said load chart in a manner correlated with the marking means of the corresponding boom stage, thereby facilitating location of the sections of said load chart corresponding to the boom stages that are extended.

6. The improvement set forth in claim 5, wherein:

the marking means for said boom stages comprises means marking each boom stage a different color; and the marking means for each arcuate section of said load chart comprises means marking each said section a color substantially the same as the color of the corresponding boom stage.

* * * * *